Sept. 13, 1927.  F. D. REYNOLDS  1,642,558
BRAKE SHOE
Filed March 15, 1926
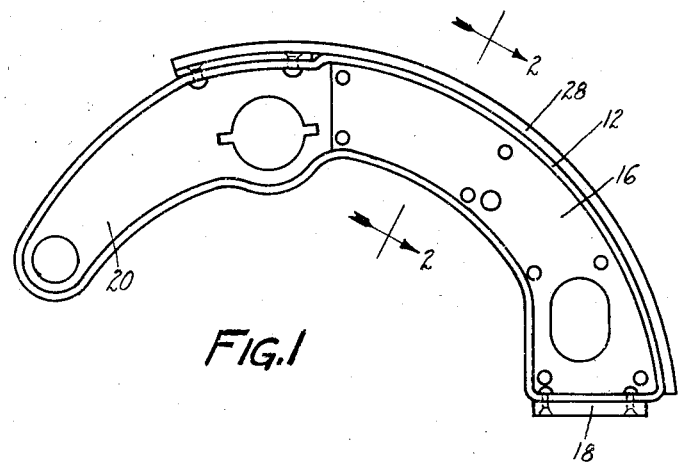
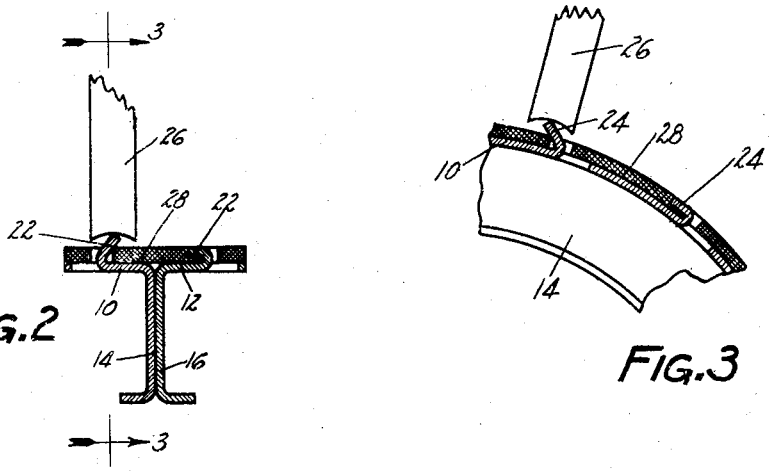
INVENTOR
FRANK D. REYNOLDS
BY
ATTORNEY Patented Sept. 13, 1927.

1,642,558

UNITED STATES PATENT OFFICE.

FRANK D. REYNOLDS, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed March 15, 1926. Serial No. 94,789.

This invention relates to brake shoes, and is illustrated as embodied in a pressed-metal brake shoe for an internal expanding automobile brake. An object of the invention is to provide inexpensive and secure means for holding the brake lining, by punching prongs out of the pressed metal of the shoe and clinching them over in the lining. Preferably the shoe is made in two parts secured together, with a separate series of prongs in each part.

The above and other features of the invention will be apparent from the following description of one illustrative embodiment shown in the accompanying drawing, in which:

Fig. 1 is a side elevation of one form of shoe embodying the invention;

Fig. 2 is a section through the shoe on the line 2—2 of Fig. 1; and

Fig. 3 is a partial section through a different shoe, on a plane corresponding to the line 3—3 of Fig. 2.

The particular shoe selected for illustration is fully described in Patent No. 1,567,716, granted Bendix Brake Company on December 29, 1925, on an application filed by Adiel Y. Dodge, although the invention is also applicable to shoes of other types. This shoe includes two stampings generally L-shaped in cross-section, and including cylindrical flanges 10 and 12 extending away from each other and forming the friction face, and radial flanges 14 and 16 riveted or otherwise secured together to form the stiffening web. At one end of the shoe there may be a cam plate 18, while at the other end of the flanges 14 and 16 may extend beyond the friction face of the shoe to form anchoring arms 20.

According to the present invention, each of the flanges 10 and 12 is provided with lining-attaching means, preferably by punching out transverse prongs 22 (Fig. 2) or longitudinal prongs 24 (Fig. 3), adapted to be bent and clinched over by a suitable tool 26 into the lining 28, the lining being drilled or punched with the holes necessary for the prongs.

While one illustrative embodiment has been described in detail, it is not my intention to limit the scope of the invention to that particular embodiment, or otherwise than by the terms of the appended claims.

I claim:

1. A brake shoe of pressed metal in two parts secured together approximately in the central plane of the shoe, with lining overlying both of said parts, each part being formed with integral prongs bent back on themselves and clinched in the lining.

2. A brake shoe of pressed metal provided with lining, and formed with integral prongs bent back on themselves and clinched in the lining.

3. A T-section brake shoe comprising two complementary pressed metal L-shaped sections secured together back to back, with their axial flanges arranged in the same circumferential plane and provided with a lining extending thereover, each of said flanges being punched out to provide prongs which project through the lining and are clinched down therein to secure the lining to the shoe.

4. A brake shoe comprising an integral, self-supporting metal structure having a circumferential lining supporting member provided with a lining and with portions punched therefrom through the lining to secure the same to the shoe.

5. A brake shoe consisting of an integral self-supporting sheet metal structure provided with a radially extending portion formed to receive a support at one end and a circumferentially extending portion provided with a brake lining secured thereto by prongs punched therefrom through the lining.

6. A brake shoe having a radially extending stiffening portion and a circumferentially extending lining supporting portion formed of the same piece of metal and provided with a lining secured to its circumferentially extending portion by prongs punched therefrom through the lining.

In testimony whereof, I have hereunto signed my name.

FRANK D. REYNOLDS.